(12) United States Patent
Takeda et al.

(10) Patent No.: US 11,731,402 B2
(45) Date of Patent: Aug. 22, 2023

(54) LAMINATE BODY, MANUFACTURING METHOD THEREFOR, AND AIRLESS TIRE

(71) Applicant: Sumitomo Rubber Industries, Ltd., Hyogo (JP)

(72) Inventors: Ai Takeda, Kobe (JP); Jun Okamoto, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 190 days.

(21) Appl. No.: 17/199,272

(22) Filed: Mar. 11, 2021

(65) Prior Publication Data

US 2021/0291496 A1    Sep. 23, 2021

(30) Foreign Application Priority Data

Mar. 17, 2020  (JP) ................................. 2020-046715
Jun. 24, 2020  (JP) ................................. 2020-108902
Sep. 28, 2020  (JP) ................................. 2020-161745

(51) Int. Cl.
*B32B 25/08*  (2006.01)
*B32B 25/14*  (2006.01)
(Continued)

(52) U.S. Cl.
CPC .............. *B32B 25/08* (2013.01); *B32B 25/14* (2013.01); *B32B 27/34* (2013.01); *B32B 27/36* (2013.01); *B32B 27/40* (2013.01); *B32B 2037/0092* (2013.01); *B32B 2250/02* (2013.01); *B32B 2274/00* (2013.01); *B32B 2307/54* (2013.01); *B32B 2605/00* (2013.01); *B60C 7/00* (2013.01); *Y10T 428/1352* (2015.01); *Y10T 428/1386* (2015.01)

(58) Field of Classification Search
CPC ......... B32B 25/08; B32B 25/14; B32B 27/34; B32B 27/36; B32B 27/40; B32B 2307/0092; B32B 2250/02; B32B 2274/00; B32B 2307/54; B32B 2605/00; B32B 2307/30; B32B 7/10; B32B 25/12; B32B 37/00; B60C 7/00; B60C 1/0016; B60C 7/146; Y10T 428/1352; Y10T 428/1386; B29D 2030/0613; B29D 30/0606; B29D 30/02; C08J 7/126; C08J 2307/00; C08J 2409/06
See application file for complete search history.

(56) References Cited

U.S. PATENT DOCUMENTS 4,311,547 A    1/1982  Biggs et al.
9,758,703 B2 *  9/2017  Funakoshi ............. C09J 109/06
(Continued)

FOREIGN PATENT DOCUMENTS

JP    2018165154 A    10/2018

OTHER PUBLICATIONS

The extended European search report issued by the European Patent Office dated Aug. 25, 2021, which corresponds to European Patent Application No. 21160946.6-1107 and is related to U.S. Appl. No. 17/199,272.

*Primary Examiner* — James C Yager
(74) *Attorney, Agent, or Firm* — Studebaker & Brackett PC

(57) ABSTRACT

A laminate body of a rubber layer and a resin layer made of a resin, wherein the rubber layer includes a surface-treated superficial layer 4 directly united with the resin layer without any intervening adhesive layer.

20 Claims, 4 Drawing Sheets

(51) Int. Cl.
  *B32B 27/34* (2006.01)
  *B32B 27/36* (2006.01)
  *B60C 7/00* (2006.01)
  *B32B 27/40* (2006.01)
  *B32B 37/00* (2006.01)

(56) References Cited

U.S. PATENT DOCUMENTS

2018/0071586 A1* 3/2018 Sullivan ............. A63B 37/0092
2018/0334521 A1* 11/2018 Gruendken ........... C08F 212/12
2022/0363800 A1* 11/2022 Claridge .............. C08G 83/001

* cited by examiner

LAMINATE BODY, MANUFACTURING METHOD THEREFOR, AND AIRLESS TIRE

TECHNICAL FIELD

The present invention relates to a laminate body in which a rubber layer and a resin layer are laminated, a manufacturing method for the laminate body, and an airless tire.

BACKGROUND ART

Conventionally, a laminate body made of rubber and resin bonded together have been used for various applications.
In recent years, in order to develop airless tires, such laminate bodies have been used.
An airless tire comprises a hub portion which is fixed to a vehicle axle, a tread ring which contacts with the ground, and a plurality of spokes which connect between the hub portion and the tread ring. The tread ring is made of a rubber material, and the spokes are made of a resin material. The tread ring and the spokes are bonded together by the use of an adhesive. The junction between the spokes and tread ring forms the above-described laminate body.
Patent Document 1: Japanese Patent Application Publication No. 2018-165154

SUMMARY OF THE INVENTION

Problems to be Solved by the Invention

By the way, when bonding the spokes to the inner surface of the tread ring, the inner surface of the tread ring is first degreased, and then pre-treated by buffing and/or applying primer. Then, the adhesive is applied to the inner surface of the tread ring. Therefore, the process of applying the adhesive is necessary, and accordingly, environmental facilities associated with the application of the adhesive are inevitably required.

Therefore, the present invention was made in consideration of the problems described above, and primary objectives of the present invention are to provide a laminate body by which it is possible to simplify the manufacturing steps and facilities therefor, and a method for manufacturing the laminate body, and further to provide an airless tire including the laminate body.

According to one aspect of the present invention, a laminate body comprises a rubber layer and a resin layer, wherein the rubber layer includes a surface-treated superficial layer directly united with the resin layer without an adhesive layer therebetween.

The surface-treated superficial layer may be a chlorinated layer.

The thickness of the surface-treated superficial layer may be 1 to 15 micrometers.

The rubber layer may contain a tackifier.

The tackifier may have a softening point of from 60 to 150 degrees C.

The tackifier may have an acid value of not more than 120.

The tackifier may be a synthetic resin.

The rubber layer may contain a thermoplastic elastomer.

The thermoplastic elastomer may be at least one selected from a group of polyester thermoplastic elastomers, polyurethane thermoplastic elastomers, and polyamide thermoplastic elastomers.

The thermoplastic elastomer may have a melting point of from 100 to 150 degrees C.

The thermoplastic elastomer may be a crystalline resin.

The resin layer may be made of a polyester resin.

The rubber layer may be made of a vulcanized rubber.

The surface free energy of the surface-treated superficial layer may be 30 to 50 mJ/sq.m.

The resin layer may be made of a thermoplastic polyamide elastomer resin.

The thermoplastic polyamide elastomer resin may have a melting point of from 120 to 180 degrees C.

The thermoplastic polyamide elastomer resin may have a tensile modulus of from 65 to 200 MPa.

The resin layer may be a thermosetting resin.

The thermosetting resin may be a urethane resin.

The thermosetting resin may have a decomposition temperature of from 180 to 220 degrees c.

According to another aspect of the present invention, an airless tire comprises any one of the above described examples of the laminate body.

According to still another aspect of the present invention, a method for manufacturing a laminate body of a rubber layer and a resin layer made of a resin, comprising the steps of:

preparing a rubber member for forming the rubber layer;

forming a surface-treated superficial layer on at least a part of the rubber member;

bringing the resin in a fluid state into contact with the surface-treated superficial layer of the rubber member without applying any adhesive to the rubber member; and uniting the resin layer with the rubber layer by hardening the liquid resin.

According to yet still another aspect of the present invention, a method for manufacturing a laminate body of a rubber layer and a resin layer made of a resin, comprising the steps of:

preparing a vulcanized rubber member for forming the rubber layer;

forming a surface-treated superficial layer on at least a part of the vulcanized rubber member;

bringing the resin in a fluid state into contact with the surface-treated superficial layer of the vulcanized rubber member without applying any adhesive to the vulcanized rubber member; and uniting the resin layer with the rubber layer by hardening the liquid resin.

Effects of the Invention

In the present invention, therefore, it is possible to simplify the manufacturing steps and facilities for providing the laminate body, manufacturing method and airless tire.

DESCRIPTION OF THE PREFERRED EMBODIMENTS

Figure 1:
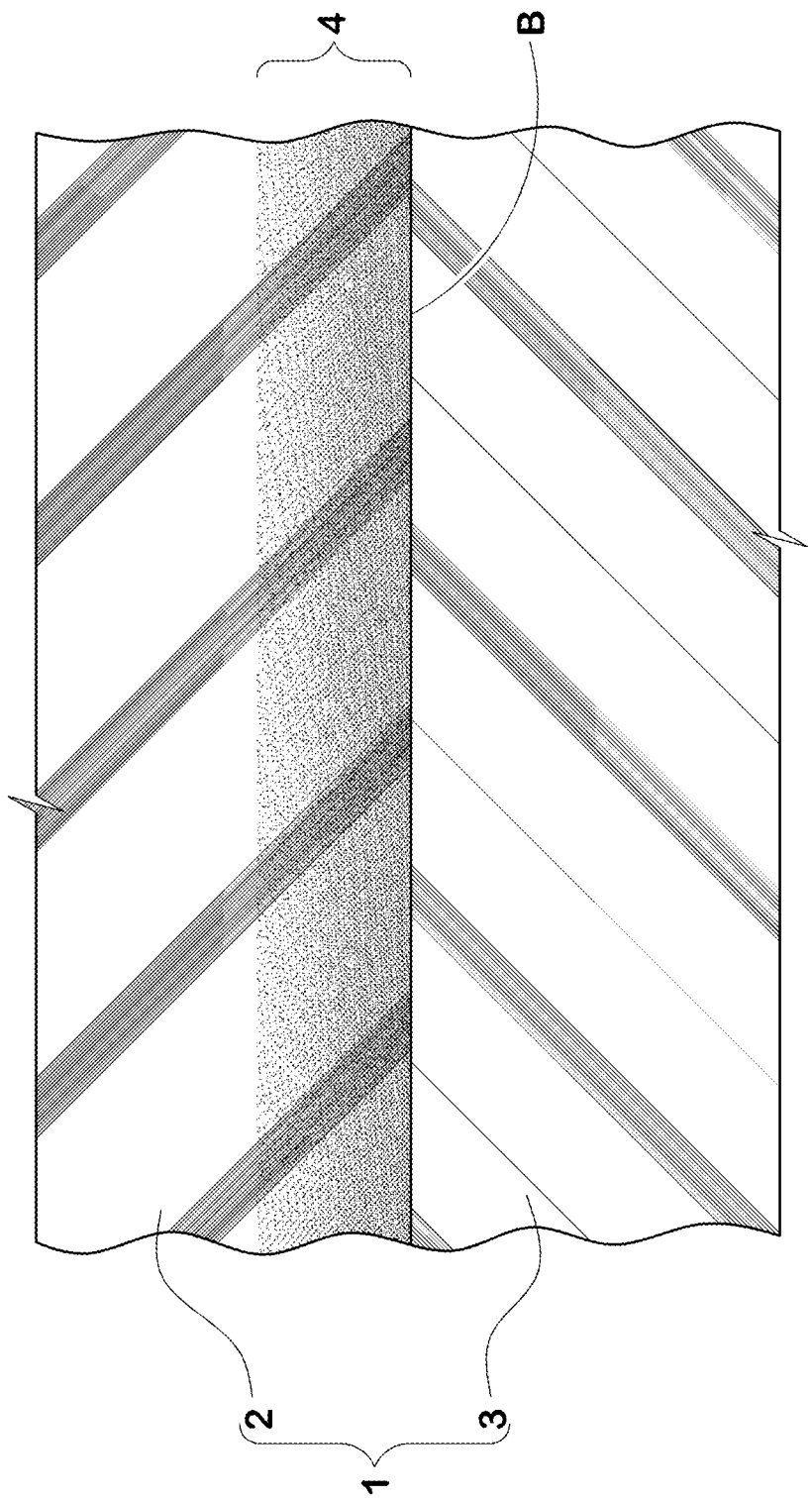
FIG. 1 is a cross-sectional partial view of a laminate body as an embodiment of the present invention.

Embodiments of the present invention will now be described in detail in conjunction with accompanying drawings. It should be noted that, in order to aid in the understanding of the present invention, the drawings may contain exaggerations and representations that differ from dimensional ratios of actual structures. And throughout the embodiments, the same or common elements are denoted by the same references sign, and redundant descriptions are omitted. Further, the embodiments and the specific configurations illustrated in the drawings are for the purpose of understanding the present invention, and the present invention is not limited to the specific configurations illustrated in the drawing.

Laminate Body, Method for Manufacturing the Same, and Airless Tire (First Embodiment)

A laminate body, a method of manufacturing the laminate body, and an airless tire according to a first embodiment of the present invention will be described.

Overall Structure of the Laminate Body (First Embodiment)

A cross-sectional partial view of the laminate body 1 is shown in FIG. 1. As shown in FIG. 1, the laminate body 1 in this embodiment is composed of a rubber layer 2 and a resin layer 3 made of a resin. The rubber layer 2 includes a surface-treated superficial layer 4 which is united directly with the resin layer 3 without an intervening layer of any adhesive at the interface B between the rubber layer 2 and the resin layer 3.

Surface Treatment Layer) (First Embodiment)

The surface-treated superficial layer 4 is formed locally on the resin layer 3 side in the rubber layer 2. The surface-treated superficial layer 4 in this embodiment is formed as a chlorinated layer, therefore, such surface-treated superficial layer 4 can be identified as a portion of the rubber layer 2 where chlorine is present.
The surface-treated superficial layer 4 can be easily formed by applying a chlorine-based primer to the surface of the vulcanized rubber layer 2 before it is united with the resin layer 3.
Such primers include, for example, the product name "Chemlock 7701" (manufactured by Lord Far East Corporation) which uses trichloroisocyanuric acid. The primers are however not particularly limited thereto, Prior to the application of the primer, the surface of the rubber layer 2 may be degreased.

It is presumed that the surface-treated superficial layer 4 creates some chemical bonding elements in the interface between the rubber layer 2 and the resin layer 3.
The inventors analyzed various laminate bodies by the use of a scanning ion microscope utilizing a focused ion beam, and found that it is desirable that the thickness of the surface-treated superficial layer 4 (measured from the interface B) is at least 1 micrometers in order to strengthen the bond between the rubber layer 2 and the resin layer 3.
If the thickness of the surface-treated superficial layer 4 is too small, then unevenness of the surface of the rubber layer 2 becomes less, and reactive factors required for the bonding becomes also less, therefore, it is difficult to obtain sufficient bond strength with the resin layer 3.
However, if the thickness of the surface-treated superficial layer 4 is too large, there is a possibility that sufficient bond strength with the resin layer 3 can not be obtained against expectations. This is presumably because the rubber layer 2 becomes decreased in the strength, which leads to the destruction of the rubber of the rubber layer 2, and thereby sufficient bond strength can not be obtained.
From this point of view, the thickness of the surface-treated superficial layer 4 is preferably not more than 15 micrometers.

Such thickness of the surface-treated superficial layer 4 is positively correlated with the number of times the primer is applied, therefore, it is possible to adjust the thickness by changing the number of applications of the primer.

Although no clear boundary between the surface-treated superficial layer 4 and the rest of the rubber layer 2 may appear, it is possible to determine the thickness of the surface-treated superficial layer 4 by identifying the locations of chlorine existing in the rubber layer 2 which locations are farthest from the interface B.

As described above, the laminate body 1 in this embodiment does not require any adhesive in order to bond the rubber layer 2 to the resin layer 3, which brings the advantage of eliminating the need for the step of applying the adhesive and the associated environmental facilities.

Rubber Component of the Rubber Layer (First Embodiment)

The rubber layer 2 is made of a rubber compound comprising a rubber component. As the rubber component, for example, diene rubber including styrene-butadiene rubber (SBR), butadiene rubber (BR), isoprene rubber, acrylonitrile butadiene rubber (NBR), chloroprene rubber (CR), butyl rubber (IIR), styrene-isoprene-butadiene copolymerized rubber (SIBR) and the like can be used.
The rubber component may consist of only one type of rubber, or may comprise two or more types of rubber.

Tackifier in the Rubber Layer (First Embodiment)

It is preferable that the rubber layer 2 contains a tackifier in addition to the rubber component. The tackifier helps to further improve the adhesion between the rubber layer 2 and the resin layer 3. For example, natural resins and synthetic resins can be used as the tackifier, and synthetic resins are preferably used. As the synthetic resins, for example, petroleum-based resins and alkylphenol resins can be preferably used.

The petroleum hydrocarbon resins include aliphatic petroleum resins, aromatic petroleum resins, aliphatic/aromatic copolymerized petroleum resins and the like, for examples. The aliphatic petroleum resins are resins obtained by cationic polymerization of unsaturated monomers such as isoprene and cyclopentadiene, which are petroleum fractions equivalent to four to five carbons (C5 fractions), namely, so called C5 petroleum resins, and the resin may be hydrogenated.
The aromatic petroleum resins are resins obtained by cationic polymerization of monomers such as vinyltoluene and alkylstyrene, which are petroleum fractions equivalent to 8 to 10 carbons (C9 fractions), namely, so called C9 petroleum resins, and the resins may be hydrogenated.
The aliphatic/aromatic copolymerized petroleum resins are resins obtained by copolymerizing the above-mentioned C5 fractions and C9 fractions, namely, so called C5/C9 petroleum resins, and the resins may be hydrogenated.
The alkylphenol resins include; alkylphenolacetylene resins which are polycondensation products of alkylphenol (e.g., p-t-butylphenol) and acetylene; and alkylphenol-formaldehyde resins which are polycondensation products of alkylphenol (e.g., p-t Butyl phenol, p-t-octylphenol, p-t-dodecylphenol) and formaldehyde. In particular, alkylphenol-formaldehyde resins are preferred.

If the softening point of the tackifier is high, it may not be sufficiently dispersed in the rubber component during the rubber kneading process. From this point of view, it is preferred that the softening point of the tackifier is not higher than 150 degrees C., more preferably not higher than 100 degrees C.

On the other hand, if the softening point of the tackifier is too low, it will be sticky and difficult to mix with the rubber, and the heat resistance of the junction may be low. From this point of view, it is preferred that the softening point of the tackifier is not lower than 60 degrees C., more preferably not lower than 70 degrees C.

In this application including the specification and claims, the softening point of is measured, according to Japanese Industrial standard (JIS) K 6220-1:2001, by the use of a ring-and-ball softening point measuring apparatus as the temperature at which the ball has sunk down.

The blending quantity of the tackifier is set in a range from 1 to 15 parts by weight, preferably set in a range from 1 to 10 parts by weight with respect to 100 parts by weight of the rubber component.

If the blending quantity of the tackifier is less than 1 part by weight, then the effect of the tackifier on the adhesion to the resin cannot be obtained sufficiently. On the other hand, if the blending quantity of the tackifier exceeds 15 parts by weight, then there is a possibility that the scorch resistance of the rubber material is deteriorated and the molding processability is decreased.

Further, it is preferred that the acid number of the tackifier is not more than 120. If the acid number of the tackifier is large, it tends to be easily oxidized, resulting in poor viscosity stability and poor adhesion to the resin layer 3. On the other hand, the lower limit of the acid number of the tackifier does not need to be set since the smaller acid number is better.

In this application including the specification and claims, the acid number of a resin is defined as the number of milligrams of potassium hydroxide required to neutralize the acid contained in 1 gram of the resin, which is measured by a potentiometric titration method specified in Japanese Industrial standard (JIS) K0070:1992.

Thermoplastic Elastomer in the Rubber Layer (First Embodiment)

The rubber layer 2 may contain a thermoplastic elastomer in addition to the rubber component. By adding the thermoplastic elastomer to the rubber layer 2, high adhesive durability is given to the rubber layer 2.

The thermoplastic elastomer is preferably at least one kind of elastomer selected from the group consisting of polyester thermoplastic elastomers, polyurethane thermoplastic elastomers, and polyamide thermoplastic elastomers.

The thermoplastic elastomer is added before vulcanizing the rubber layer 2. Therefore, it is desirable that the thermoplastic elastomer has a melting point lower than the vulcanization temperature because the thermoplastic elastomer needs to make compatible blend with the rubber component during vulcanization.

On the other hand, if the melting point of the thermoplastic elastomer is too low, there is a possibility that the thermoplastic elastomer volatilizes during vulcanization. From this point of view, the melting point of the thermoplastic elastomer is preferably set in a range from 100 to 150 degrees C.

As to the thermoplastic elastomers, particularly preferred are polyester thermoplastic elastomers. Among them, when the affinity with polyester resins described below is considered, crystalline resins with ester bonds are preferred in terms of providing higher adhesive durability to the rubber layer 2.

Such crystalline resin constitutes a discontinuous phase (island region in sea-island structure), and is presumed to exist in particle shape similarly to filler. Therefore, it is presumed that, owing to the crystalline resin existing in the form of particles, the elasticity and rigidity of the rubber layer 2 are enhanced, and as a result, the strength thereof is improved.

The crystalline resins with ester bonds include crystalline polyester thermoplastic resins, crystalline polycarbonate thermoplastic resins, crystalline polyurethane thermoplastic resins and the like. Among them, crystalline polyester thermoplastic resins and crystalline polycarbonate thermoplastic resins are preferred.

Such crystalline resins available on the market are, for example, Toyobo Co., Ltd.'s crystalline polyester resin "Byron" series, and Toray Industries, Inc.'s "Hitrel" series.

As described above, the rubber layer 2 with the added thermoplastic elastomer can reinforce the surface-treated superficial layer 4 by its own increased strength, and can suppress shearing occurring at the interface B with the resin layer 3 when a load is applied to the rubber layer 2. Therefore, it becomes possible to obtain high adhesion durability between the rubber layer 2 and the resin layer 3.

In the rubber layer 2, the amount of the thermoplastic elastomer added is not particularly limited, but if the amount is too much, the vulcanization time becomes faster and the viscosity of the rubber becomes lower, which may worsen the processability. From this point of view, with respect to 100 parts by weight of the rubber component, the amount of the thermoplastic elastomer added is preferably set to be not more than 10 parts by weight, for example.

In addition to the above described components, the composition of the rubber layer 2 in this embodiment may also include compounding agents commonly used in the manufacture of rubber materials, such as zinc oxide, stearic acid, various anti-aging agents, plasticizers such as oils and waxes, vulcanizing agents (sulfur, organic peroxides, etc.), vulcanization accelerators, etc.

Resin Layer (First Embodiment)

The resin layer 3 is composed of a polymer material. The polymer material is not particularly limited, but a resin or elastomer which can be molded by the casting or injection method is preferred.

Such resins or elastomers include, for example, polyolefin, polyvinyl chloride, polystyrene, methacrylic resin, polycarbonate, polyamide, polyimide, polyacetal, fluorine resin, urea resin, phenol resin, polyester, polyurethane, epoxy resin, melamine resin, and silicon resin. resin, silicon resin, etc. From the viewpoint of moldability and processability and the degree of freedom in designing the material, polyurethane resin, polyamide resin, and polyester resin are preferable among the above polymeric materials, and especially polyester resin is more preferable.

Manufacturing Method (First Embodiment)

Next, a method for manufacturing the laminate body 1 of this embodiment will be described in detail with reference to FIGS. 2A, 2B, 2C and 2D.

The manufacturing method in this embodiment comprises the steps of:

preparing a rubber member 2a for forming the rubber layer 2;

forming the surface-treated superficial layer 4 on at least a part of the rubber member 2a;

bringing the resin in a fluid state 3a into contact with the surface-treated superficial layer 4 of the rubber member 2a without applying any adhesive to the rubber member 2a; and uniting the resin layer 3 with the rubber layer 2 by hardening the resin in a fluid state 3a.

Figure 2A:
FIGS. 2A, 2B, 2c and 2D are cross-sectional views for illustrating a method for manufacturing the laminate body as an embodiment of the present invention.

The rubber member 2a is vulcanization molded into a predetermined shape as shown in FIG. 2A for example, through a separate process carried out in advance.

Figure 2B:
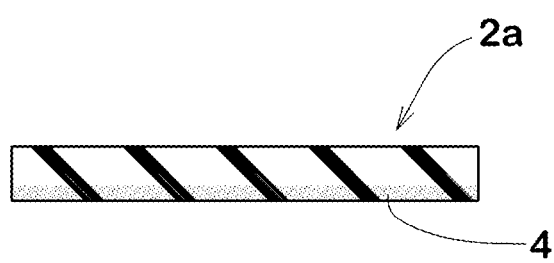

At least a part of the prepared rubber member 2a (specifically, a part of the surface which is to be bonded to the resin layer 3) is chlorinated so as to form the surface-treated superficial layer 4 as shown in FIG. 2B for example. In other words, chlorine is introduced into the above-said surface of the rubber member 2a.

Figure 2C:
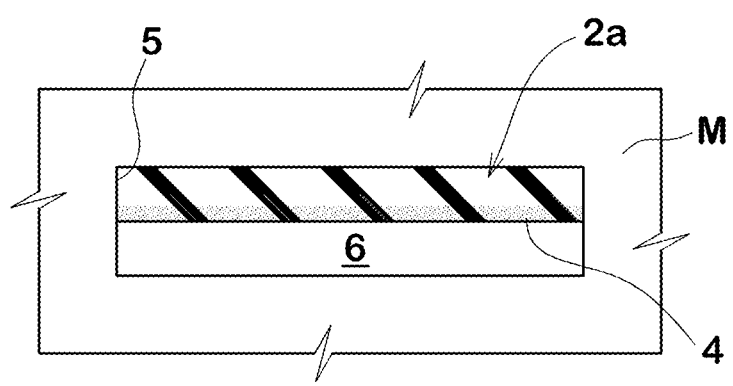

The surface-treated rubber member 2a is set in a cavity 5 of a mold M as shown in FIG. 2(c) for example.

At this time, the cavity 5 is left with an empty space 6 into which the liquid resin 3a can be supplied, and the rubber member 2a is positioned so that the surface-treated superficial layer 4 faces the empty space 6 of the cavity 5.

Figure 2D:
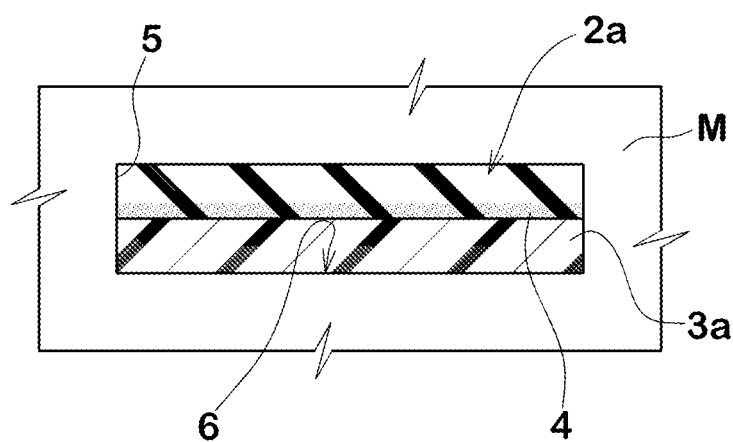

Then, as shown in FIG. 2(d), the liquid resin 3a is supplied to the empty space 6 of the cavity 5. This causes the liquid resin 3a to contact with the surface-treated superficial layer 4 of the rubber member 2a.

The supplying of the liquid resin 3a may be either pouring of a thermosetting resin or injecting of a thermoplastic resin.

By hardening or curing the liquid resin 3a supplied to the empty space 6 of the cavity 5, it is possible to obtain the laminate body 1 in which the rubber layer 2 and the resin layer 3 are united with each other directly without an intervening layer of any adhesive as shown in FIG. 1.

The hardening of the resin 3a is made in a heating process or a cooling process, depending on the type of the resin employed.

Airless Tire (First Embodiment)

Figure 3:
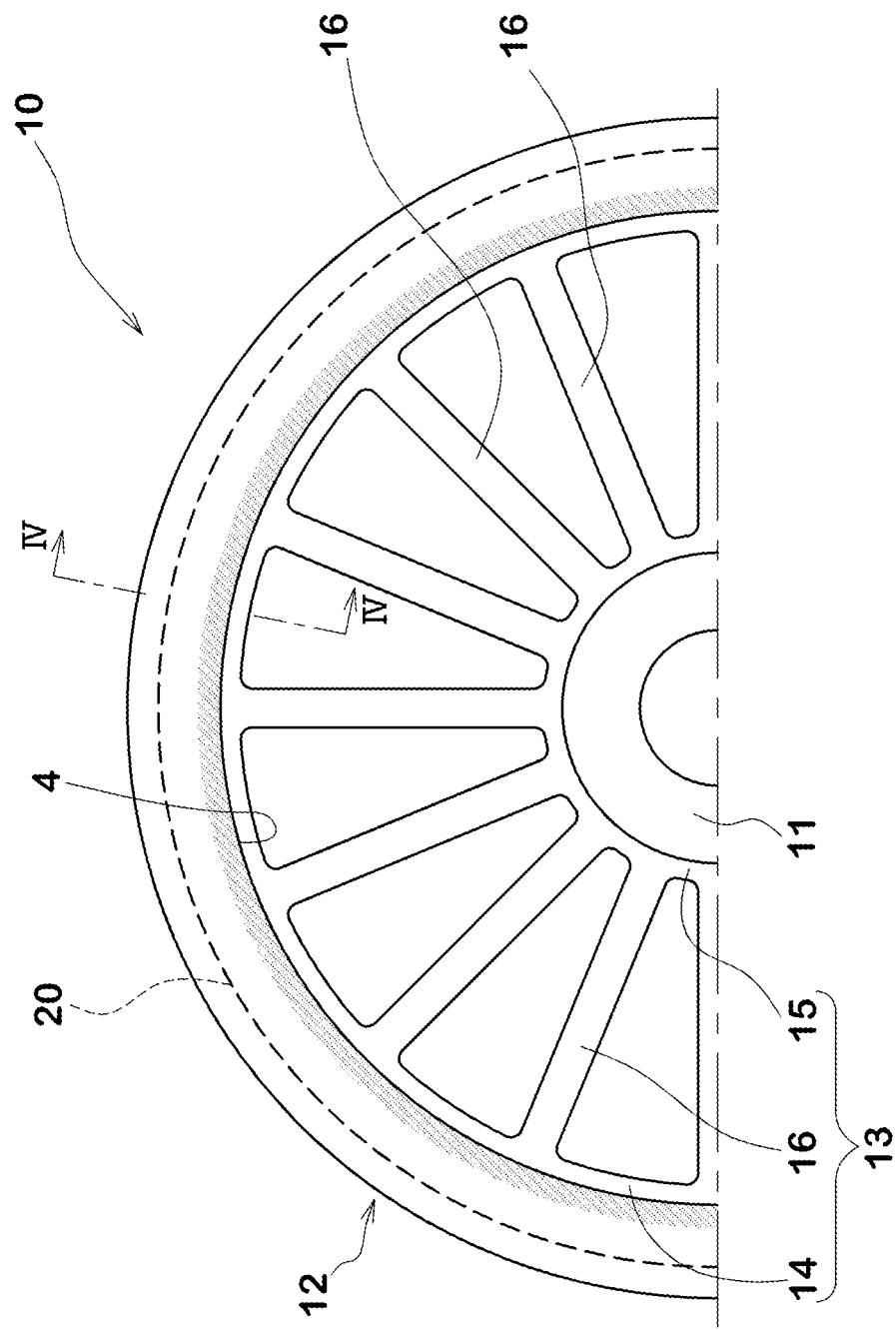
FIG. 3 is a partial side view of an airless tire as an embodiment of the present invention.

Next, an airless tire using the laminate body 1 of this embodiment will be described with reference to FIG. 3 which is a partial side view of the airless tire viewed in the tire axle direction, and FIG. 4 which is a cross-sectional view taken along line Iv-iv of FIG. 3.

As shown, the airless tire 10 comprises a hub portion 11 fixed to a vehicle axle, a tread ring 12 for contacting with the ground, and a spoke portion 13 connecting between the hub portion 11 and the tread ring 12.

The hub portion 11 is made of a metal material, for example.

The tread ring 12 is made of the rubber material. The tread ring 12 has the surface-treated superficial layer 4 on its radially inner surface side. The surface-treated superficial layer 4 is formed by chlorination treatment.

The tread ring 12 may be provided with an internal reinforcing cord layer 20 to increase its circumferential stiffness and the like.

The spoke portion 13 is formed from the resin material (e.g., polyester resin). The spoke portion 13 of this embodiment integrally includes an outer annular portion 14 in the tire radial direction, an inner annular portion 15 in the tire radial direction, and a plurality of spoke elements 16.

The outer portion 14 is an annular body connected to the radially inner circumferential surface (i.e., the surface-treated superficial layer 4) of the tread ring 12.

The thickness in the tire radial direction of the outer portion 14 is not particularly limited, but the thickness is set in a range from about 0.5 to 5.0 mm, preferably about 1.0 to 3.0 mm for example.

The inner portion 15 is an annular body connected to the radially outer circumferential surface of the hub portion 11. The spoke elements 16 extend radially of the tire to connect between the outer portion 14 and the inner portion 15.

Figure 4:
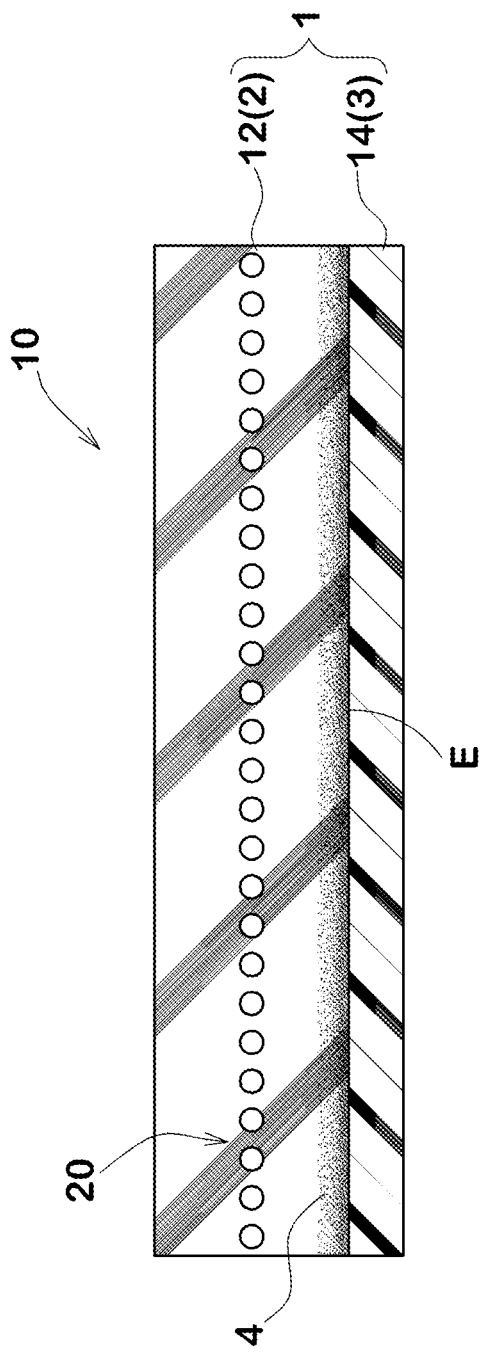
FIG. 4 is a cross-sectional view taken along line Iv-iv of FIG. 3.

The surface-treated superficial layer 4 of the tread ring 12 and the outer portion 14 are directly united with each other without an intervening layer of any adhesive, as shown in FIG. 4. Therefore, the tread ring 12 and the outer portion 14 of the airless tire 10 in this embodiment correspond to the rubber layer 2 and the resin layer 3 of the laminate body 1, respectively. Thus, the airless tire 10 is manufactured by using the laminate body 1 of the present invention.

The manufacturing method of the airless tire 10 of this embodiment is as follows.

First, the tread ring 12 is prepared by vulcanization molding. Next, the surface-treated superficial layer 4 is formed on the radially inner circumferential surface of the tread ring 12, wherein the surface-treated superficial layer 4 is formed by a chlorination treatment, for example.

Next, the tread ring 12 and hub portion 11 are set in a cavity of a mold (both omitted in the figure). After these are set, the cavity of the mold leaves an empty space for molding the spoke portion 13. The liquid resin is supplied into this empty space.

By hardening the liquid resin, the airless tire 10 can be obtained in which the surface-treated superficial layer 4 of the tread ring 12 and the resin of the spoke portion 13 are directly united with each other without an intervening layer of any adhesive.

Laminate Body, Method for Manufacturing the Same, and Airless Tire (Second Embodiment)

A laminate body, a method for manufacturing the laminate body, and an airless tire of a second embodiment of the present invention will be described. Structures of the second embodiment which are identical to those of the first embodiment are indicated with the same reference signs and the redundant descriptions are omitted.

Overall Structure of the Laminate Body (Second Embodiment)

As shown in FIG. 1, the laminate body 1 of this embodiment is composed of a rubber layer 2 and a resin layer 3 made of a resin.

The rubber layer 2 in this embodiment is composed of a vulcanized rubber. The vulcanized rubber includes a surface-treated superficial layer 4, which is united directly with the resin layer 3 without an intervening layer of any adhesive.

Surface Treatment Layer (Second Embodiment)

The surface-treated superficial layer 4 is formed locally on the resin layer 3 side in the rubber layer (vulcanized rubber) 2.

The surface-treated superficial layer 4 in this embodiment is formed as a chlorinated layer for example.

Only the differences between the surface-treated superficial layer 4 of this embodiment and the surface-treated superficial layer 4 of the first embodiment will be explained hereinafter.

The surface-treated superficial layer 4 has a surface free energy in a range from 30 to 50 (mJ/sq.m). Advantage of setting the surface free energy was found by analysis of the laminate body 1 described in the first embodiment.

By setting the surface free energy to at least 30 (mJ/sq.m), the surface free energy of the surface-treated superficial layer 4 can be made larger than that of the rubber layer (vulcanized rubber) 2. This makes it possible to bring the surface free energy of the surface-treated superficial layer 4 and the surface free energy of the resin layer 3 closer together. As a result, in the laminate body 1 of this embodiment, the rubber layer 2 can be firmly united with the resin layer 3 via the surface-treated superficial layer 4.

On the other hand, by setting the surface free energy to be not more than 50 mJ/sq.m, it is possible to prevent the surface free energy of the surface-treated superficial layer 4 from becoming larger than necessary, and as a result, the surface free energy of the surface-treated superficial layer 4 can be prevented from differing from the surface free energy of the resin layer 3. Thereby, a strong bond between the rubber layer 2 and the resin layer 3 can be maintained. From this point of view, it is preferable that the surface free energy is not less than 38 (mJ/sq.m), preferably not more than 45 (mJ/sq.m).

In this application including the specification and claims, the surface free energy (mJ/sq.m) is determined by the Owens-Wendt method using the following software, wherein the following liquid reagents are dropped onto the surface-treated superficial layer 4, and the contact angle with each of the liquid reagents is measured based on the following conditions.

Contact angle meter: "DM-501H1" manufactured by Kyowa Surface Science Co.
Software: Multi-functional integrated analysis software "FAMAS (interFAce Measurement and Analysis System)"
Temperature: 23 degrees C.
Humidity: 55% RH
Liquid reagents: water, diiodomethane (drop volume: 1.0 microliter)
Contact angle: Average value of contact angle measured 10 times Similar to the laminate body 1 of the first embodiment, since no adhesive is used in the uniting of the rubber layer 2 and the resin layer 3, the laminate body 1 of this embodiment brings the advantage of not requiring the steps of applying an adhesive and applying heat to the adhesive so as to react. Therefore, it is possible to simplify the manufacturing steps and facilities for providing the laminate body 1.

By eliminating the need for the above steps, the rubber layer (vulcanized rubber) 2 is not heated indirectly by the heating to the adhesive as in the past. Therefore, in the laminate body 1 of this embodiment, deterioration of physical properties of the vulcanized rubber can be suppressed.

Rubber Component of the Rubber Layer (Vulcanized Rubber) (Second Embodiment)

The rubber layer (vulcanized rubber) 2 is made of a rubber compound comprising a rubber component. The rubber component of this embodiment can be the same as that of the first embodiment.

Tackifier in the Rubber Layer (Vulcanized Rubber) (Second Embodiment)

The rubber layer (vulcanized rubber) 2 preferably contain a tackifier in addition to the rubber component in order to further improve the bond between the rubber layer 2 and the resin layer 3. The tackifier in this embodiment may be the same as that of the first embodiment.

Thermoplastic Elastomer in the Rubber Layer (Vulcanized Rubber) (Second Embodiment)

The rubber layer (vulcanized rubber) 2 may contain a thermoplastic elastomer in addition to the rubber component in order to give high adhesive durability to the rubber layer 2. As to the thermoplastic elastomer in this embodiment, the same elastomer as that of the first embodiment may be employed.

In addition to the above described components, the composition of the rubber layer (vulcanized rubber) 2 in this embodiment may also include compounding agents commonly used in the manufacture of rubber materials, such as zinc oxide, stearic acid, various anti-aging agents, plasticizers such as oils and waxes, vulcanizing agents (sulfur, organic peroxides, etc.), vulcanization accelerators, etc.

Resin Layer (Second Embodiment)

The resin layer 3 is composed of a polymer material. The polymer material is not particularly limited, but a resin or elastomer which can be molded by the casting or injection method is preferred. The resin or elastomer in this embodiment may be the same as the resin or elastomer in the first embodiment.

For the resin or elastomer, polyurethane resin, polyamide resin, polyester resin, etc. may be employed preferably, and polyamide resin (thermoplastic polyamide elastomer resin) may be employed even more preferably, from the viewpoint of moldability and processability and the degree of freedom in designing the material.

Such thermoplastic polyamide elastomer resin can improve adhesion to the rubber layer 2 (surface-treated superficial layer 4) and heat resistance as compared to other resins (such as polyester resin).

It is preferable that the melting point of the thermoplastic polyamide elastomer resin is in a range from 120 to 180 degrees C.

By setting the melting point to 120 degrees C. or higher, the heat resistance of the resin layer 3 can be improved.

Further, when the laminate body 1 is used in the spoke portion 13 (shown in FIG. 3) of the airless tire 10, it is possible to improve the durability (including heat resistance at high speeds) of the spoke portion 13.

On the other hand, by setting the melting point of the thermoplastic polyamide elastomer resin at 180 degrees C. or lower, it is possible to prevent the degree of crystallinity of the thermoplastic polyamide elastomer resin from increasing, thus preventing the resin layer 3 from becoming harder than necessary.

Therefore, when the laminate body 1 is used in the spoke portion 13 of the airless tire 10 (shown in FIG. 3), the deterioration in the ride comfort can be suppressed.

In order to effectively derive this effect, the melting point is preferably not lower than 140 degrees C. and preferably not higher than 160 degrees C.

The "melting point" can be measured based on Differential scanning calorimetry (DSC).

It is preferable that the tensile modulus of the thermoplastic polyamide elastomer resin is in a range from 65 to 200 MPa.

By setting the tensile modulus to 65 MPa or higher, the deformation of the resin layer 3 against load can be reduced. Further, when the laminate body 1 is used in the spoke portion 13 of the airless tire 10 (shown in FIG. 3), the vehicle load supporting performance can be improved.

On the other hand, by setting the tensile modulus to 200 MPa or lower, the resin layer 3 can be prevented from becoming harder than necessary. Therefore, when the laminate body 1 is used for the spoke portion 13 of the airless tire 10, the deterioration in the ride comfort can be suppressed.

In order to effectively exert these effects, the tensile modulus is preferably not lower than 100 MPa and preferably not higher than 160 MPa.

In this application including the specification and claims, the "tensile modulus" is measured according to Japanese Industrial standard (JIS) K6394 under the following conditions, using a viscoelasticity spectrometer (Iwamoto Manufacturing Co., Ltd.)

Initial distortion: 10%
Dynamic distortion: +/−1%
Frequency: 10 Hz
Deformation mode: Tensile
Measurement temperature: 30 degrees C.

Manufacturing Method (Second Embodiment)

Next, the manufacturing method of the laminate body 1 of this embodiment will be described with reference to FIGS. 2A, 2B, 2C and 2D.

The manufacturing method of this embodiment comprises the steps of:
preparing the vulcanized rubber member (rubber member) 2a for forming the rubber layer 2;
forming the surface-treated superficial layer 4 on at least a part of the vulcanized rubber member (rubber member) 2a;
bringing the resin in a fluid state 3a into contact with the surface-treated superficial layer 4 of the vulcanized rubber member (rubber member) 2a without applying any adhesive to the vulcanized rubber member (rubber member) 2a; and
uniting the resin layer 3 with the rubber layer 2 by hardening the liquid resin 3a.

For the detailed procedure in each step, the same procedure as in the manufacturing method of the first embodiment may be employed.

Airless Tire (Second Embodiment)

Next, an airless tire using the laminate body 1 of this embodiment will be described.

The airless tire 10 of this embodiment comprises a hub portion 11 which is fixed to a vehicle axle, a tread ring 12 for contacting with the ground, and a spoke portion 13 which connects between the hub portion 11 and the tread ring 12.

For the hub portion 11, the tread ring 12, and the spoke portion 13 of this embodiment, the same structures as those of the hub portion 11, the tread ring 12, and the spoke portion 13 of the first embodiment can be employed.

The tread ring 12 in this embodiment is made of vulcanized rubber.

As for the resin material for the spoke portion 13 of this embodiment, for example, thermoplastic polyamide elastomer resin can be employed.

In the same way as the airless tire 10 of the first embodiment, the tread ring 12 and the outer portion (outer rubber portion) 14 correspond to the rubber layer 2 and the resin layer 3, respectively, therefore, the airless tire 10 of this embodiment is manufactured using the laminate body 1 of the present invention.

As to the manufacturing method for the airless tire 10 of this embodiment, the same procedures as those of the manufacturing method of the airless tire 10 of the first embodiment can be employed.

Laminate Body, Manufacturing Method for the Laminate Body, and Airless Tire (Third Embodiment)

Next, a laminate body, a method for manufacturing the laminate body, and an airless tire of a third embodiment of the present invention will be described. Structures of the third embodiment which are identical to those of the first and second embodiments are indicated with the same reference signs and the redundant descriptions are omitted.

Overall Structure of the Laminate Body (Third Embodiment)

As shown in FIG. 1, the laminate body 1 of this embodiment is composed of the rubber layer 2 and the resin layer 3 made of the resin.

The rubber layer 2 in this embodiment is composed of the vulcanized rubber. The vulcanized rubber layer includes the surface-treated superficial layer 4, which is united directly with the resin layer 3 without an intervening layer of any adhesive.

Surface Treatment Layer (Third Embodiment)

The surface-treated superficial layer 4 is formed locally on the resin layer 3 side in the rubber layer (vulcanized rubber) 2.

The surface-treated superficial layer 4 in this embodiment is formed, for example, as the chlorinated layer.

Only the differences between the surface-treated superficial layer 4 of this embodiment and the surface-treated superficial layer 4 of the first embodiment will be explained hereinafter.

In order to strengthen the bond between the rubber layer 2 and the resin layer 3, the thickness of the surface-treated superficial layer 4 (measured from the interface B) is preferably set in the same range as in the first embodiment. This is due to the results of analysis of laminate bodies made by the inventors.

The inventors analyzed various laminate bodies by the use of a scanning ion microscope utilizing a focused ion beam, and found that the surface-treated superficial layer forms unevenness on the surface of the rubber layer (at the interface B), and such unevenness exerts an anchoring effect which increase the bond between the rubber layer 2 and the resin layer 3.

Further, by the use of an atomic force microscopy (AFM), the inventors analyzed the laminate bodies (surface-treated superficial layers), and found that the surface-treated superficial layer became relatively hard in the rubber layer. It is conceivable that the hardening of the surface-treated superficial layer was caused by a reaction between the rubber layer and the primer applied thereto, and thereby the bond between the rubber layer and the resin layer was improved.

Furthermore, through the analysis, the inventors found that it is desirable that the surface-treated superficial layer 4 has a surface free energy of from 30 to 50 mJ/sq.m in order to strengthen the bond between the rubber layer 2 and the resin layer 3. The surface free energy was explained in the second embodiment as above.

As with the laminate body 1 of the first and second embodiments, the laminate body 1 of this embodiment does not require any adhesive to bond between the rubber layer 2 and the resin layer 3, which brings the advantage of eliminating the need for the step of applying an adhesive and the step of applying heat to the adhesive to make it react. Therefore, it is possible to simplify the steps and facilities for manufacturing the laminate body 1.

In addition, by eliminating the need for the above steps, the rubber layer (vulcanized rubber) 2 is not heated indirectly along with the heating of the adhesive as in the past, therefore, the deterioration of the physical properties of the vulcanized rubber can be suppressed.

Rubber Component of the Rubber Layer
(Vulcanized Rubber) (Third Embodiment)

The rubber layer (vulcanized rubber) 2 is made of a rubber compound containing a rubber component. As to the rubber component of this embodiment, the same rubber component as that of the first embodiment can be employed Tackifier in the Rubber Layer (Vulcanized Rubber)
(Third Embodiment)

The rubber layer (vulcanized rubber) 2 preferably contains a tackifier in addition to the rubber component in order to further improve the adhesion between the rubber layer 2 and the resin layer 3. As to the tackifier in this embodiment, the same tackifier as in the first embodiment can be employed.

Thermoplastic Elastomer in the Rubber Layer
(Third Embodiment)

The rubber layer 2 may contain a thermoplastic elastomer in addition to the rubber component in order to give high adhesive durability to the rubber layer 2. As to the thermoplastic elastomer in this embodiment, the same thermoplastic elastomer as that of the first embodiment can be employed.

In addition to the above described components, the composition of the rubber layer (vulcanized rubber) 2 in this embodiment may also include compounding agents commonly used in the manufacture of rubber materials, such as zinc oxide, stearic acid, various anti-aging agents, plasticizers such as oils and waxes, vulcanizing agents (sulfur, organic peroxides, etc.), vulcanization accelerators, etc.

Resin Layer (Third Embodiment)

The resin layer 3 in this embodiment is made of a thermosetting resin. The thermosetting resin is formed by polymerization (cross-linking reaction) through heating. As compared to thermoplastic resins, such a thermosetting resin is difficult to deform even when heat is applied after molding, and further, it has a property of suppressing the temperature rise when load is applied. Therefore, the resin layer 3 made of such thermosetting resin is improved in the heat resistance, and can improve the durability of the laminate body 1.

Further, when the resin layer 3 is used in the spoke portion 13 (shown in FIG. 3) of the airless tire 10, it becomes possible to improve the durability (including heat resistance at high speeds) of the spoke portion 13.

The thermosetting resin of the resin layer 3 in this embodiment is not particularly limited, but thermosetting resins which can be molded by a casting method are preferably employed. Such resins include polyolefin, polyvinyl chloride, polystyrene, methacrylic resin, polycarbonate, polyamide, polyimide, polyacetal, fluoropolymer, urea resin, phenol resin, polyester, polyurethane, epoxy resin, melamine resin, silicon resin, etc.

From the point of view of moldability and processability and the degree of freedom in designing the material, preferably employed are polyurethane resins, polyamide resins, and polyester resins. Among them, polyurethane resins are more preferably employed since such polyurethane resins can exhibit higher elastic properties than other resins.

It is desirable that the decomposition temperature of the thermosetting resin is in a range from 180 to 220 degrees C. Here, the decomposition temperature is the temperature at which the thermosetting resin thermally decomposes.

By setting the decomposition temperature to 180 degrees C. or higher, it is possible to improve the heat resistance of the resin layer 3. Further, when the laminate body 1 is used in the spoke portion 13 (shown in FIG. 3) of the airless tire 10, it is possible to improve the durability (including heat resistance at high speeds) of the spoke portion 13.

On the other hand, by setting the decomposition temperature of the thermosetting resin to 220 degrees C. or lower, the degree of cross-linking of the thermosetting resin can be prevented from becoming high, and thus, the resin layer 3 can be prevented from becoming harder than necessary. Therefore, when the laminate body 1 is used in the spoke portion 13 of the airless tire 10 (shown in FIG. 3), the deterioration in ride comfort can be suppressed.

In order to effectively exert such effects, the decomposition temperature of the thermosetting resin is preferably not lower than 190 degrees C., and preferably not higher than 210 degrees C.

The "decomposition temperature" can be measured based on Differential scanning calorimetry (DSC).

Manufacturing Method (Third Embodiment)

Next, the manufacturing method of the laminate body 1 of this embodiment will be described with reference to FIGS. 2A, 2B, 2C and 2D.

The manufacturing method of this embodiment comprises the steps of:

preparing the vulcanized rubber member (rubber member) 2a for forming the rubber layer 2;

forming the surface-treated superficial layer 4 on at least a part of the vulcanized rubber member (rubber member) 2a;

bringing the resin in a fluid state 3a into contact with the surface-treated superficial layer 4 of the vulcanized rubber member (rubber member) 2a without applying any adhesive to the vulcanized rubber member (rubber member) 2a; and uniting the resin layer 3 with the rubber layer 2 by hardening the liquid resin 3a.

For the detailed procedure in each step, the same procedure as in the manufacturing method of the first embodiment may be employed.

The resin 3a in this embodiment is the thermosetting resin as described above. For this reason, in order to harden the resin 3a, the manufacturing method of this embodiment comprises a step of heating the resin 3a (thermosetting resin) to harden the liquid resin 3a.

Airless Tire (Third Embodiment)

Next, an airless tire using the laminate body 1 of this embodiment will be described.

The airless tire 10 of this embodiment comprises a hub portion 11 which is fixed to a vehicle axle, a tread ring 12 for contacting with the ground, and a spoke portion 13 which connects the hub portion 11 to the tread ring 12.

For the hub portion 11, the tread ring 12, and the spoke portion 13 of this embodiment, the same structures as those of the hub portion 11, the tread ring 12, and the spoke portion 13 of the first embodiment can be employed.

The tread ring 12 in this embodiment is made of the vulcanized rubber.

The spoke portion 13 of this embodiment is formed with a resin layer 3 made of the thermosetting resin.

The thickness of the outer portion 14 of this embodiment is not particularly limited, but preferably about 0.5 to 10.0 mm, more preferably about 1.0 to 5.0 mm, for example.

In the same way as the airless tire 10 of the first embodiment, the tread ring 12 and the outer portion 14 of the airless tire 10 of this embodiment correspond to the rubber layer 2 and the resin layer 3, respectively, of the laminate body 1, therefore, the airless tire 10 of this embodiment is manufactured using the laminate body 1 of the present invention.

In the airless tire 10 of this embodiment, the spoke portion 13 (resin layer 3) is made of the thermosetting resin, which makes it possible to improve the durability (including heat resistance at high speeds) of the spoke portion 13. Further, since the surface-treated superficial layer 4 of the tread ring 12 and the outer portion 14 of the spoke portion 13 are directly united with each other without an intervening layer of adhesive, it is possible to prevent a decrease in bond strength due to softening of the adhesive or other factors during high-speed driving when the surface-treated superficial layer 4 and the outer portion 14 are subjected to high temperatures. Therefore, the airless tire 10 in this embodiment can be improved in the durability (heat resistance) at high speeds.

As to the manufacturing method for the airless tire 10 of this embodiment, the same procedures as those of the manufacturing method of the airless tire 10 of the first embodiment can be employed.

In the manufacturing method of this embodiment, since the tread ring (vulcanized rubber) 12 is not heated indirectly as a result of the heating of the adhesive, it possible to suppress the deterioration of the physical properties of the tread ring 12.

While detailed description has been made of especially preferable embodiments of the present invention, the present invention can be embodied in various forms without being limited to the illustrated embodiments.

EMBODIMENTS

In the following, more specific and non-limiting embodiments of the present invention will be described.

Embodiment A several types of rubber compounds were prepared based on rubber compositions shown in Table 1. These were press vulcanized at a pressure of 5 MPa and a temperature of 170 degrees C. for 12 minutes to obtain a 4 mm×120 mm×150 mm vulcanized rubber sheet of each compound.

The vulcanized rubber sheet was degreased with isopropanol to prepare a sample rubber layer.

Next, in order to form the surface-treated superficial layer, a surface treatment agent containing chlorinating agents (Chemlock 7701, trade name from Lord Far East Corporation) was applied to a surface of the above sample of the rubber layer. After the solvent of the surface treatment agent evaporated and volatilized, the surface treatment agent was again applied. such application and evaporation were repeated three times.

The sample of the rubber layer that had undergone the above surface treatment was placed in a cavity of a mold, and polyester resin was injected into an empty space of the cavity and molded. The thickness of the resin layer was adjusted to 3 mm.

After the resin layer was hardened, the laminate body consisting of the polyester resin layer and the rubber layer was removed from the mold, and then a strip of 25 mm wide and 100 mm long was cut out therefrom as a sample of the laminate body.

Then, a peeling test (T-peeling) was conducted to evaluate the bond strength at the interface between the rubber layer and the resin layer of the laminate body.

The peeling test was made according to Japanese Industrial standard (JIS) K6854, under a room temperature condition (23 degrees C. and 55% humidity) and a high temperature condition (80 degrees C.).

Further, the following two tests were also conducted for reference.

<<Molding Processability>>

For each of the unvulcanized rubber compositions shown in Table 1, vulcanization test was performed at a measurement temperature of 130 degrees C. by using a vibrating vulcanization tester (curastometer) described in Japanese Industrial standard K6300 to obtain a vulcanization speed curve representing the torque with respect to the elapsed time. Then, the minimum torque ML, maximum torque MH, and difference ME=MH−ML were determined therefrom, and the scorch time (minute) which is a time t10 required to reach to a torque of ML+0.1 ME was obtained.

The results are indicated in Table 1 by an index based on the scorch time of working example 1 being 100, wherein the higher the value, the longer the scorch time namely the better the molding processability.

<<Breaking Strength>>

From the vulcanized rubber layer, a No. 6 dumbbell-shaped test piece was cut out, and in accordance with JIS K6251:2010, "Vulcanized rubber and thermoplastic rubber—Determination of tensile properties", a tensile test was conducted under an atmosphere of 25 degrees C. to measure the breaking strength TB (MPa) and elongation EB (%) at break. Then, the value of TB×EB/2 (MPa %) was calculated and converted into an index based on working Example 4 being 100.

The results are indicated in Table 1 wherein the higher the value, the better the breaking strength.

TABLE 1

|  | working ex.1 | working ex.2 | working ex.3 | working ex.4 | working ex.5 | working ex.6 | comparative ex.1 | comparative ex.2 |
|---|---|---|---|---|---|---|---|---|
| rubber composition | | | | | | | | |
| natural rubber | 80 | 80 | 80 | 80 | 80 | 80 | 80 | 80 |
| SBR | 20 | 20 | 20 | 20 | 20 | 20 | 20 | 20 |
| phenolic tackifier | 1.5 | 1.5 | 1.5 | — | 1.5 | 1.5 | 1.5 | — |
| petroleum-based tackifier | 1.5 | 1.5 | 1.5 | — | 1.5 | 1.5 | 1.5 | — |
| sulfur | 3 | 3 | 3 | 3 | 3 | 3 | 3 | 3 |
| vulcanizing accelerator | 3.6 | 3.6 | 3.6 | 3.6 | 3.6 | 3.6 | 3.6 | 3.6 |
| stearic acid | 1.5 | 1.5 | 1.5 | 1.5 | 1.5 | 1.5 | 1.5 | 1.5 |
| thermoplastic elastomer | | | | | | | | |
| polyester type(melting point 126 deg. C.) | — | 3 | 5 | 13 | — | — | 5 | — |
| polyester type(melting point 143 deg. C.) | — | — | — | — | 3 | — | — | — |
| polyamide type(melting point 135 deg. C.) | — | — | — | — | — | 3 | — | — |
| surface treatment agent | | | | | | | | |
| trichloroisocyanuric acid | yes | yes | yes | yes | yes | yes | no | yes |
| adhesive agent | | | | | | | | |
| vulcanization adhesive agent | no | no | no | no | no | no | yes | yes |
| test results | | | | | | | | |
| molding processability (index) | 100 | 132 | 138 | 141 | 132 | 60 | 138 | 86 |
| breaking strength (index) | 116 | 112 | 108 | 100 | 112 | 109 | 108 | 110 |
| peeling test (N/25 mm) @ room temp | material breakage | material breakage | material breakage | material breakage | material breakage | material breakage | interfacial delamination | 103 |
| peeling test (N/25 mm) @ 80 deg. C.) | material breakage | material breakage | material breakage | material breakage | material breakage | material breakage | interfacial delamination | 55 |
| drum test (index) | 100 | 101 | 105 | 100 | 100 | 110 | 21 | 50 |

In the laminate bodies of working Examples 1-6, material breakage occurred in the rubber layer, but delamination did not occur at the interface between the rubber layer and the resin layer in the peeling test.
In the comparative Example 1, on the other hand, interfacial delamination occurred between the resin layer and the rubber layer i.e., at the adhesive layer.
Thus, it was confirmed that the laminate bodies of the working Examples had high bond strength although there is no intervening adhesive layer between the rubber layer and the resin layer. Also it was confirmed that the working Examples were comparable to comparative Example 1 in terms of the molding processability and breaking strength.

Next, airless tires were experimentally manufactured using the compositions of the rubber and resin layers shown in Table 1, and tested for the durability using a tire test drum. In the test, the running distance until damage occurred on the airless tire was measured under a tire load of 2.0 kN and a speed of 60 km/h. The results are shown in Table 1 by an index based on working Example 1 being 100, wherein the higher the value, the better the durability.
From the test results, it was confirmed that the airless tire of the working Examples exhibited excellent durability.

Embodiment B

Several types of rubber compounds were prepared based on the rubber compositions shown in Table 2.
Then, according to the procedure explained in Embodiment A as above, samples of rubber layers with surface treated layers were obtained from these rubber compounds.

The thickness of the surface-treated superficial layer was set to 5 micrometers.
Then, the contact angle of the surface of the vulcanized rubber treated as explained above (surface-treated superficial layer) was measured, and the surface free energy was obtained as described above.
Further, the sample of the rubber layer was placed in the cavity of the mold, and polyester resin was injected into the empty space of the cavity and molded.
The thickness of the resin layer was adjusted to 3 mm. After hardening the resin layer, the laminate body of the polyester resin layer and the rubber layer was removed from the mold, and a strip of 25 mm wide and 100 mm long was cut out therefrom as a sample of the laminate body.
Then, a peeling test (T-peeling) was conducted to evaluate the bond strength at the interface between the rubber layer and the resin layer of the laminate body.
The peeling test was made in the same way as in Embodiment A.
In addition, in order to evaluate the permanence of the laminate body (durability of the adhesion at the interface between the rubber and resin layers), the samples were kept in an indoor environment of 60 degrees C. and 90% humidity for 200 hours, and thereafter kept in a room temperature environment of 23 degrees C. and 55% humidity for 1 hour. Then, according to JIS K6854, a peeling test (T-peeling) was made under the room temperature condition of 23 degrees C. and 55% humidity.

The test results are shown in Table 2.

TABLE 2

| | working ex.7 | working ex.8 | comparative ex.3 | comparative ex.4 | comparative ex.5 | comparative ex. 6 |
|---|---|---|---|---|---|---|
| tread ring (rubber layer (vulcanized rubber)) rubber composition | | | | | | |
| natural rubber | 80 | 80 | 80 | 80 | 80 | 80 |
| SBR | 20 | 20 | 20 | 20 | 20 | 20 |
| phenolic tackifier | 1.5 | — | 1.5 | 1.5 | 1.5 | 1.5 |
| petroleum-based tackifier | 1.5 | 1.5 | 1.5 | 1.5 | 1.5 | 1.5 |
| sulfur | 3 | 3 | 3 | 3 | 3 | 3 |
| vulcanizing accelerator | 3.6 | 3.6 | 3.6 | 3.6 | 3.6 | 3.6 |
| stearic acid | 1.5 | 1.5 | 1.5 | 1.5 | 1.5 | 1.5 |
| spoke portion(resin layer) thermoplastic elastomer | | | | | | |
| polyester type | — | — | yes | — | — | — |
| polyamide type | yes | yes | — | yes | yes | yes |
| surface treatment layer surface treatment agent | | | | | | |
| trichloroisocyanuric acid | yes | yes | no | no | yes | yes |
| contact angle | 43 | 45 | 38 | 25 | 42 | 44 |
| surface free energy (mJ/sq ·m) adhesive agent | | | | | | |
| epoxy type | no | no | no | no | yes | no |
| phenolic type | no | no | no | yes | no | yes |
| test results | | | | | | |
| peeling test (N/25 mm) @ room temp. | material breakage | material breakage | material breakage | 10 | material breakage | material breakge |
| peeling test (N/25 mm) @ 80 deg. C. | material breakage | material breakage | 184 | 2 | material breakage | 20 material breakage |
| permanence test (N/25 mm) @ 60 deg. C. | material breakage | material breakage | material breakage | 12 | 45 | material breakage |
| drum test (index) | 100 | 100 | 45 | 10 | 60 | 80 |

In the laminate bodies of working Examples 7 and 8, material breakage occurred in the rubber layer, but delamination did not occur at the interface between the rubber layer and the resin layer in both of the peeling test and the permanence test. In the laminate bodies of comparative Examples 3 and 4, on the other hand, delamination occurred at the interface between the rubber layer and the resin layer. In the laminate bodies of comparative Examples 5 and 6, interfacial delamination occurred in the adhesive layer between the resin layer and the rubber layer.

Thus, it was confirmed that the laminate bodies in the working Examples had high bond strength over a long period of time, even without any intervening adhesive layer between the rubber layer and the resin layer, and that the steps and facilities for manufacturing the laminate bodies could be simplified.

Next, airless tires were experimentally manufactured using the compositions of the rubber and resin layers shown in Table 2, and tested for the durability using a tire test drum in the same way as in Embodiment A.
The test results are shown in Table 2 by an index based on working Example 7 being 100, wherein the higher the value, the better the durability.

As a result of the test, it was confirmed that the airless tires of working Examples demonstrated superior durability as compared to the airless tire of comparative examples. Thus, it was confirmed that the working Example tires could inhibit the degradation of the physical properties of vulcanized rubber.

Embodiment C

Based on the rubber composition of working Example 7 shown in Table 2, a plurality of laminate bodies (working Examples 9-14) differing only in the thickness of the surface-treated superficial layer were prepared.

Then, a peeling test (T-peeling) was conducted to evaluate the bond strength at the interface between the rubber layer and the resin layer in the laminate body. Further, the permanence of the laminate body (durability of the adhesion at the interface between the rubber and resin layers) was evaluated.

The detailed procedures of these test methods were the same as those in Embodiment B as described above.

The test results are shown in Table 3.

TABLE 3

|  | working ex.9 | working ex.10 | working ex.11 | working ex.12 | working ex.13 | working ex.14 |
|---|---|---|---|---|---|---|
| surface treatment layer |  |  |  |  |  |  |
| thickness (micron) | 0.5 | 1 | 5 | 10 | 15 | 20 |
| test results |  |  |  |  |  |  |
| peeling test (N/25 mm) @ room temp. | 220 | material breakage | material breakage | material breakage | material breakage | material breakage |
| peeling test (N/25 mm) @ 80 deg. C.) | material breakage | material breakage | material breakage | material breakage | material breakage | 250 |
| permanence test (N/25 mm) @ 60 deg. C.) | material breakage | material breakage | material breakage | material breakage | material breakage | material breakage |

As a result of the test, the laminate bodies of working Examples 9 and 14, in which the thickness of the surface-treated superficial layer was outside the preferred range, interfacial delamination occurred between the resin layer and the rubber layer although the bond strength was increased as compared to Comparative Examples 3 to 6 shown in Table 1 of Embodiment B. On the other hand, in the laminate bodies of working Examples 10 to 13 where the thickness of the surface-treated superficial layer was within the preferred range, no interfacial delamination occurred at the interface between the rubber layer and the resin layer, therefore, it was confirmed that high bond strength could be obtained.

Embodiment D several airless tires were experimentally manufactured based on the rubber composition of working Example 7 in Table 2, changing the melting point and tensile modulus of the thermoplastic polyamide elastomer resin. Then, the airless tires (working Examples 15-20) were tested for the durability, using a tire test drum. The procedure for the drum durability test was the same as Embodiment A as described above.

The results are indicated in Table 4 by an index based on working Example 15 being 100.

Further, the airless tires (working Examples 15-20) were tested for the ride comfort. The airless tires were attached to the axles of a vehicle (small electric vehicle: product name "COMS") as the four wheels, and ran on a dry asphalt road surface of a tire test course.

The ride comfort was evaluated by the driver. The results are shown in Table 4 by an index based on working Example 20 being 100, wherein the higher the number, the better the ride comfort.

As a result of the test, the working Example tires with the melting point of the thermoplastic polyamide elastomer resin and the tensile modulus within the preferred range were able to improve the ride comfort, while exhibiting superior durability compared to the other examples.

Embodiment E

Several types of rubber compounds were prepared based on the rubber compositions shown in Table 5. Then, based on the procedure explained in Embodiment A, samples of rubber layers with surface treated layers were obtained from these rubber compounds. The thickness of the surface-treated superficial layer was set to 5 micrometers.

Further, the sample of the rubber layer was placed in the cavity of the mold, and the thermosetting or thermoplastic resin was filled into the empty space in the cavity to form the resin layer.

The thickness of the resin layer was adjusted to 3 mm.

After hardening the resin layer, the laminate body of the resin layer and the rubber layer was removed from the mold, and a strip of 25 mm wide and 100 mm long was cut out therefrom as a sample of the laminate body.

Then, a peeling test (T-peeling) was conducted to evaluate the bond strength at the interface between the rubber layer and the resin layer of the laminate body.

The peeling test was made according to Japanese Industrial standard (JIS) K6854, under a room temperature condition (23 degrees C. and 55% humidity) and a high temperature condition (150 degrees C.). The test results are shown in Table 5.

TABLE 4

|  | working ex.15 | working ex.16 | working ex.17 | working ex.18 | working ex.19 | working ex.20 |
|---|---|---|---|---|---|---|
| thermoplastic polyamide elastomer |  |  |  |  |  |  |
| melting point (deg. C.) | 110 | 135 | 146 | 153 | 160 | 164 |
| tensile modulus (MPa) | 77 | 90 | 126 | 157 | 120 | 251 |
| test results |  |  |  |  |  |  |
| drum test (index) | 100 | 110 | 113 | 115 | 108 | 122 |
| ride comfort (index) | 122 | 118 | 106 | 103 | 115 | 100 |

TABLE 5

| | working ex.21 | working ex.22 | comparative ex.7 | comparative ex.8 | comparative ex.9 | comparative ex.10 |
|---|---|---|---|---|---|---|
| tread ring(rubber layer (vulcanized rubber)) rubber composition | | | | | | |
| natural rubber | 80 | 80 | 80 | 80 | 80 | 80 |
| SBR | 20 | 20 | 20 | 20 | 20 | 20 |
| phenolic tackifier | 1.5 | — | 1.5 | 1.5 | 1.5 | 1.5 |
| petroleum-based tackifier | 1.5 | 1.5 | 1.5 | 1.5 | 1.5 | 1.5 |
| sulfur | 3 | 3 | 3 | 3 | 3 | 3 |
| vulcanizing accelerator | 3.6 | 3.6 | 3.6 | 3.6 | 3.6 | 3.6 |
| stearic acid | 1.5 | 1.5 | 1.5 | 1.5 | 1.5 | 1.5 |
| spoke portion(resin layer) thermosetting resin | | | | | | |
| urethane type | yes | yes | — | yes | yes | — |
| thermoplastic resin | | | | | | |
| polyester type | — | — | yes | — | — | — |
| urethane type | — | — | — | — | — | yes |
| surface treatment layer | | | | | | |
| surface treatment agent trichloroisocyanuric acid | yes | yes | yes | no | no | yes |
| adhesive agent | | | | | | |
| phenolic type | no | no | no | no | yes | no |
| test results | | | | | | |
| peeling test (N/25 mm) @ room temp. | material breakage | material breakage | material breakage | 10 | 26 | material breakage |
| peeling test (N/25 mm) @ 150 deg. C. | material breakage | material breakage | 45 | 2 | 13 | 14 |
| high-speed durability (index) | 126 | 120 | 100 | 32 | 40 | 67 |

Test results are as follows:
in the laminate bodies of working Examples 21 and 22, material breakage occurred in the rubber layer, and delamination did not occur at the interface between the rubber layer and the resin layer in the peeling test (room temperature and 150 degrees C.);
in the laminate bodies of comparative Examples 7 and 10, interfacial delamination occurred between the resin layer and the rubber layer under the high temperature condition;
in the laminate body of Comparative Example 8, interfacial delamination occurred between the resin layer and the rubber layer; and
in the laminate body of Comparative Example 9, interfacial delamination occurred in the adhesive layer between the resin layer and the rubber layer.

Thus, it was confirmed that the laminate bodies of the working Examples had high bond strength over a long period of time, even without an intervening adhesive layer between the rubber layer and the resin layer, and that the steps and facilities for manufacturing the laminate bodies could be simplified.
In the working Examples, the rubber layer was not heated again, so the deterioration of physical properties of the rubber layer was suppressed.
Further, it was confirmed that the heat resistance of the laminate body in the working Examples could be improved because the resin layer was composed of thermosetting resin.
Next, using the compositions of the rubber and resin layers shown in Table 5, airless tires were experimentally manufactured and tested for the high-speed durability using a tire test drum.
In the high-speed durability test, the tire was rotated under a tire load of 2.6 kN, starting from a speed of 100 km/h, and the speed was gradually increased by 10 km/h step every 10 minutes to obtain the maximum speed at which the airless tire was not damaged.
The results are indicated in Table 5 by an index based on Comparative Example 7 being 100, wherein the higher the value, the better the high-speed durability.
As a result of the test, it was confirmed that the airless tires of working Examples demonstrated superior high-speed durability as compared to the airless tire of Comparative Examples. Therefore, it was confirmed that the working examples could suppress the deterioration of the physical properties of the vulcanized rubber and improve the heat resistance of the resin layer.

Embodiment F

Based on the rubber composition of working Example 21 shown in Table 5, several airless tires were experimentally manufactured, changing the decomposition temperature of the thermosetting resin (urethane-based) as shown in Table 6. Then, the airless tires of working Examples 23-28 were tested for the high-speed durability, using a tire test drum. The procedure for the drum durability test was the same as working Example E as described above.
The results are indicated in Table 6 by an index based on working Example 24 being 100.
Further, the airless tires of working Examples 23-28 were tested for the ride comfort.
The airless tires were attached to the axles of a vehicle (small electric vehicle: product name "COMS") as the four wheels, and ran on a dry asphalt road surface of a tire test course.

The ride comfort was evaluated by the driver. The results are shown in Table 6 by an index based on working Example 24 being 100, wherein the higher the number, the better the ride comfort.

TABLE 6

|  | working ex.23 | working ex.24 | working ex.25 | working ex.26 | working ex.27 | working ex.28 |
|---|---|---|---|---|---|---|
| thermosetting resin |  |  |  |  |  |  |
| decomposition temp. (deg. C.) | 170 | 180 | 200 | 210 | 220 | 230 |
| test results |  |  |  |  |  |  |
| high-speed durability (index) | 80 | 100 | 111 | 114 | 116 | 120 |
| ride comfort (index) | 115 | 110 | 108 | 107 | 105 | 98 |

As a result of the test, it was confirmed that the working Examples tires in which the decomposition temperature of the thermosetting resin (urethane-based) was within the preferred range were improved in the ride comfort, while exhibiting superior high-speed durability as compared to the other examples.

Embodiment G

Based on the rubber composition of working Example 21 shown in Table 5, a plurality of laminate bodies of working Examples 29-34 were prepared, changing only thickness of the surface-treated superficial layer as shown in Table 7. Then, a peeling test (T-peeling) was conducted to evaluate the bond strength at the interface between the rubber layer and the resin layer in the laminate body. The detailed procedure of the peeling test method was the same as that in Embodiment E as described above. The test results are shown in Table 7.

TABLE 7

|  | working ex.29 | working ex.30 | working ex.31 | working ex.32 | working ex.33 | working ex.34 |
|---|---|---|---|---|---|---|
| surface treatment layer |  |  |  |  |  |  |
| thickness (micron) | 0.5 | 1 | 5 | 10 | 15 | 16 |
| test results |  |  |  |  |  |  |
| peeling test (N/25 mm) @ room temp. | 230 | material breakage | material breakage | material breakage | material breakage | material breakage |
| peeling test (N/25 mm) @ 150 deg. C. | material breakage | material breakage | material breakage | material breakage | material breakage | 260 |

Test results are as follows:

in the laminate bodies of working Examples 29 and 34 where the thickness of the surface-treated superficial layer was outside the preferred range, the bond strength was increased as compared to Comparative Examples 7-10 shown in Table 5 of Embodiment E, but interfacial delamination occurred between the resin layer and the rubber layer; and in the laminate bodies of working Examples 30-33 where the thickness of the surface-treated superficial layer was within the preferred range, interfacial delamination did not occur at the interface between the rubber layer and the resin layer.

Thus, it was confirmed that high bond strength could be obtained.

DESCRIPTION OF THE REFERENCE SIGNS 1 laminate body
2 rubber layer
3 resin layer
4 surface-treated superficial layer
10 airless tire

The invention claimed is:

1. An airless tire comprising:
   a laminate body of a rubber layer made of a rubber material; and
   a resin layer made of a resin,
wherein
   the rubber layer includes a surface-treated superficial layer directly united with the resin layer without any intervening adhesive layer,
   the airless tire further comprises
      a hub portion fixed to a vehicle axle;
      a tread ring for contacting with the ground; and
      a spoke portion connecting between the hub portion and the tread ring,
   the spoke portion is made of said resin and integrally includes
      a radially inner annular portion connected to the hub portion;
      a radially outer annular portion connected to the tread ring; and
      a plurality of spoke elements connecting between the radially outer annular portion and the radially inner annular portion,
   the tread ring is made of said rubber material and is provided, on the radially inner circumferential surface thereof, with said surface-treated superficial layer so as to form said rubber layer, and
   the outer portion of the spoke portion forms said resin layer, whereby the tread ring is directly united with the outer portion of the spoke portion without any intervening adhesive layer.

2. The airless tire according to claim 1, wherein the surface treated layer is a chlorinated layer.

3. The airless tire according to claim 1, wherein the thickness of the surface-treated superficial layer is 1 to 15 micrometers.

4. The airless tire according to claim 1, wherein the rubber layer contains an tackifier.

5. The airless tire according to claim 4, wherein the tackifier has a softening point of from 60 to 150 degrees C.

6. The airless tire according to claim 4, wherein the tackifier has an acid value of not more than 120.

7. The airless tire according to claim 4, wherein the tackifier is a synthetic resin.

8. The airless tire according to claim 1, wherein the rubber layer contains a thermoplastic elastomer.

9. The airless tire according to claim 8, wherein the thermoplastic elastomer is at least one selected from a group of polyester thermoplastic elastomers, polyurethane thermoplastic elastomers, and polyamide thermoplastic elastomers.

10. The airless tire according to claim 8, wherein the thermoplastic elastomer has a melting point of from 100 to 150 degrees C.

11. The airless tire according to claim 8, wherein the thermoplastic elastomer is a crystalline resin.

12. The airless tire according to claim 1, wherein the resin layer is made of a polyester resin.

13. The airless tire according to claim 1, wherein the rubber material of the rubber layer is made of a vulcanized rubber.

14. The airless tire according to claim 13, wherein the surface-treated superficial layer has a surface free energy of from 30 to 50 mJ/sq.m.

15. The airless tire according to claim 13, wherein the resin of the resin layer is made of a thermoplastic polyamide elastomer resin.

16. The airless tire according to claim 15, wherein the thermoplastic polyamide elastomer resin has a melting point of from 120 to 180 degrees C.

17. The airless tire according to claim 15, wherein the thermoplastic polyamide elastomer resin has a tensile modulus of from 65 to 200 MPa.

18. The airless tire according to claim 13, wherein the resin of the resin layer is made of a thermosetting resin.

19. The airless tire according to claim 18, wherein the thermosetting resin is a urethane resin.

20. The airless tire according to claim 18, wherein the thermosetting resin has a decomposition temperature of from 180 and 220 degrees C.

\* \* \* \* \*